Nov. 15, 1955     A. F. HUBBARD     2,723,616
VENTILATING AND HEATING APPARATUS

Filed Oct. 15, 1951     6 Sheets-Sheet 1

INVENTOR.
Arthur F. Hubbard
BY Arthur Robert
ATTORNEY

Nov. 15, 1955

A. F. HUBBARD 2,723,616

VENTILATING AND HEATING APPARATUS

Filed Oct. 15, 1951

INVENTOR.
Arthur F. Hubbard
BY Arthur Robert
ATTORNEY

Nov. 15, 1955 A. F. HUBBARD 2,723,616
VENTILATING AND HEATING APPARATUS
Filed Oct. 15, 1951 6 Sheets-Sheet 3

INVENTOR.
Arthur F. Hubbard
BY
Arthur H. Robert
ATTORNEY

Nov. 15, 1955 A. F. HUBBARD 2,723,616
VENTILATING AND HEATING APPARATUS
Filed Oct. 15, 1951 6 Sheets-Sheet 4
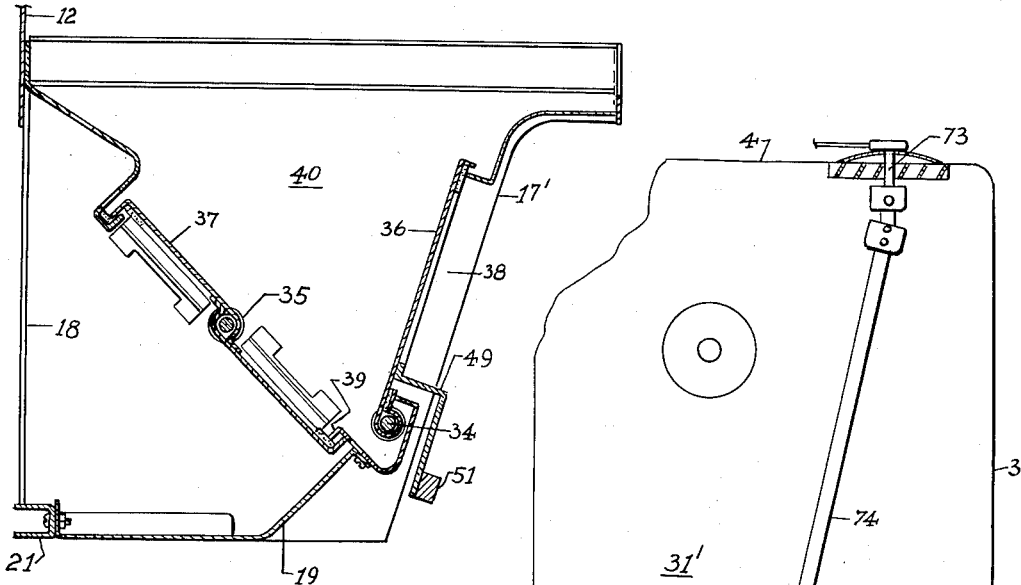
Fig. 8
Fig. 10
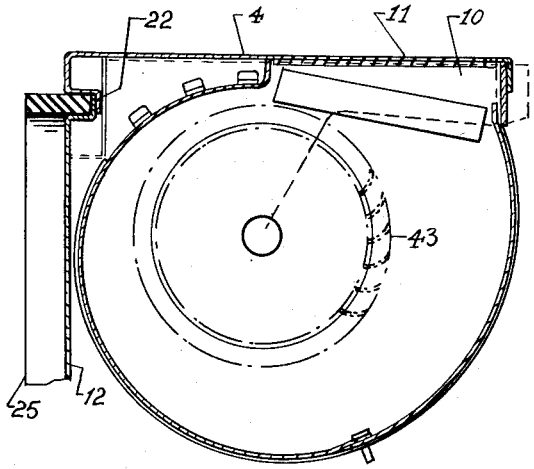
Fig. 9
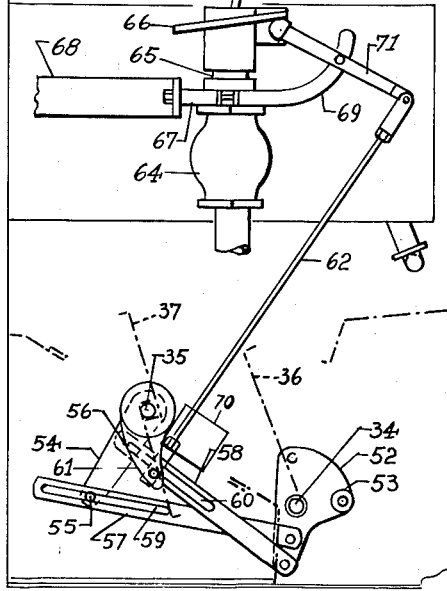
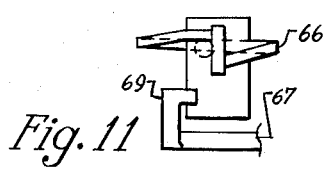
Fig. 11
INVENTOR.
Arthur F. Hubbard
BY Arthur Robert
ATTORNEY Nov. 15, 1955  A. F. HUBBARD  2,723,616
VENTILATING AND HEATING APPARATUS
Filed Oct. 15, 1951  6 Sheets-Sheet 5

INVENTOR.
Arthur F. Hubbard
BY
ATTORNEY

Nov. 15, 1955 A. F. HUBBARD 2,723,616
VENTILATING AND HEATING APPARATUS
Filed Oct. 15, 1951 6 Sheets-Sheet 6

INVENTOR.
Arthur F. Hubbard
BY
Arthur Robert
ATTORNEY

United States Patent Office 2,723,616
Patented Nov. 15, 1955

2,723,616

VENTILATING AND HEATING APPARATUS

Arthur F. Hubbard, Moline, Ill., assignor to American Air Filter Company Inc., Louisville, Ky., a corporation of Delaware Application October 15, 1951, Serial No. 251,429

16 Claims. (Cl. 98—38)

It has previously been recognized, in the heating of rooms, that cold air flows down along the outer walls and windows of a room, and for this reason radiation or convection heaters generally are located below and adjacent windows in a room in an attempt to heat the cold air and prevent drafts. In one proposed heating system a unit ventilator cabinet, of the type exemplified by Patent 1,988,745 issued January 22, 1935, to R. H. Nelson, which is controlled manually or by a suitable automatic temperature controller, is located beneath the window area, and air from the room is drawn in through a front grille at the bottom of the cabinet, is mixed with filtered air drawn from the outside as required, and the air is heated and forcibly discharged at the top of the unit at about windowsill level at an angle toward the ceiling, thus forming a curtain of warm air of limited extent in front of the window. This upward-flowing curtain of air aspirates the cold air flowing downstream along the window, carrying it upward and warming it, and at the ceiling the warm air becomes distributed throughout the room.

The modern design schoolroom has extensive light-admitting areas in the outside walls, which may extend for the full length of the outside wall. As a unit ventilator sufficient to heat the room occupies only a short length of the wall area beneath the light-admitting area, it has been integrated in design with flanking utility cabinets extending along the remainder of the wall below the light-admitting area to promote a harmonious, pleasing decorative effect in the room. However, cold air flowing down the light admitting or window area beyond the ends of the unit ventilator spills over the tops of the utility cabinets flanking the unit ventilator into the room, and creates uncomfortable drafts at about windowsill level and along the floor. This condition becomes more aggravated the lower the outside temperature.

For each volume of outside air introduced into the room by the unit ventilator an equal volume must be removed from the room. Heretofore various exhaust means have been provided, as for example, a transom grille over the door that opens into a hall, or a waste air shaft or vent at an inside wall of the room opposite the unit ventilator. Thus, because the air recirculating openings of the unit ventilator are near the middle of the outside wall near the floor, there is a tendency for cold air to flow along the side walls of the room to the wall where the vents are located, and also cold air flows along the floor of the room towards the ventilator unit. This flow of cold air produces the sensation of draft near the feet of the occupants, even though the room temperature may otherwise be adequate. A further cause of discomfort arises by radiation loss from the bodies of the occupants in the room toward the extensive cold window areas.

The object of the present invention is to provide an arrangement for heating and ventilating a room with elimination of draft due to the downstream flow of cold air along windows or outer walls.

A further object is the provision of a heating and ventilating arrangement that eliminates floor or wall drafts in the room.

Still another object is the provision of a heating and ventilating arrangement that economizes on fuel by discharging cool excess air from the room during the heating season.

In one embodiment of the invention I provide a unit heater and ventilator incorporating a blower below the light-admitting area along the outside wall, operating substantially as shown in said Nelson patent, said unit being flanked on either or both ends by a partition in spaced relation to the room wall to provide a passageway or collecting chamber for recirculating air that communicates with the room at or below the light-admitting area and is connected to the recirculating air inlet of said unit. In this improved construction, the cold downstream of air along the windows at an end of said unit enters the collecting chamber between the room wall and partition and by reason of the blower suction, flows along the collecting chamber to the recirculating inlet of the unit. The unit discharges air of proper temperature at sill level diagonally upward toward the ceiling, to form a curtain of air in front of the window substantially as wide as the unit ventilator. At the ceiling the air diffuses throughout the room to provide a comfortable room temperature. This floor of cold air from the window area directly to the unit ventilator prevents the cold air from the window beyond the end of the unit ventilator flowing directly into the occupied space of the room, and thus eliminates draft. This improved construction adapts itself to the architectural design of flanking utility cabinets because the partition may be the back wall of the utility cabinets and, if desired, a foot duct along the room wall or floor connected along its length to said collecting chamber also may be structurally incorporated into the base support of the utility cabinets so the collecting chamber thus formed is generally L-shaped.

When the unit ventilator is located at one end of the outside wall the outlets at the top are arranged to direct the air stream upwardly toward the middle; when the unit ventilator is located between one end and the middle of the room, the air stream is directed upwardly and part of the upwardly directed air is directed also toward the middle; and when the unit ventilator is located at the middle, the air stream is directed upwardly with part being directed toward the ends of the room.

In a modification of the invention, the partition along the wall may be omitted, and a foot duct running along the floor may have grilled openings along its length to draw air from adjacent the floor along the outside wall into the unit ventilator. Where utility cabinets are used in this construction the duct may be incorporated in the base of the cabinets and the openings may be at the bottom of the cabinets so that any cold air that spills over the cabinets is drawn from along the length of the outside wall along the floor into the unit ventilator. Or, in a modification where the duct and cabinets do not extend the full length of the light admitting area; end covers of the ventilator cabinets may be provided with openings for conducting air from adjacent the outside wall of the room into the duct. The invention contemplates the admission of outside air to the inlet of the heater-ventilator cabinet and admixture of outside air and recirculated air in any desired proportion by means of manually controlled or automatically controlled damper means in known manner, as for example as illustrated in said Nelson patent. The inlet for outside air may be connected to an opening in the wall, or may be connected through the lower rail of a window or at the bottom through the floor as desired.

According to another feature of the present invention, air exhaust vents are located adjacent the exterior wall of the room, preferably behind a partition that provides a space communicating with the room. In such case also, the partition may be provided by a utility cabinet along the wall. This arrangement may be combined with the collecting chamber above described by locating the air exhaust vents in communication with the recirculating air passage or collecting chamber so that air forced out of the room comes from the cold downdraft along the outside wall. These vents may be controlled by automatic pressure dampers so as to allow air to flow out only when outside air is being drawn into the room. Even when the room is overheated, as by sun effect, the warm air at the windowsill or sunboard line will be removed, because the pressure caused by introduction of outside air into the room by the unit ventilator forces out an equal volume of air adjacent the wall. Thus, only the air adjacent the wall be cold or overheated. If desired, exhausting of air may be accomplished by the provision of a fan or blower for each exhaust vent.

As a further modification, where it is desired to employ shafts to remove excess air, the vents to the shafts are located behind the partition, preferably at the corners of the room most remote from the unit ventilator. Or, if it is desired to use excess air for heating locker rooms or coatrooms, the air from the vents behind the partition adjacent the ends remote from the unit ventilator is conducted to such auxiliary rooms by suitable ducts. In the embodiment referred to above wherein the air for recirculation is carried to the unit ventilator by a duct near the floor along the wall, and no space is provided between the cabinets and room wall, the vent for exhausting air may be placed in communication with this duct, preferably near the end or ends remote from the unit ventilator.

The invention will be described in greater detail in connection with the accompanying drawing wherein are illustrated preferred embodiments by way of example, and wherein:

Figure 8 is a fragmentary section taken on the line VIII—VIII of Figure 2;

Figure 9 is a fragmentary section taken on line IX—IX of Figure 2;

Figure 10 is a partly diagrammatic end view of Figure 2 as seen from the left;

Figure 11 shows a detail in elevation;

Figure 1:
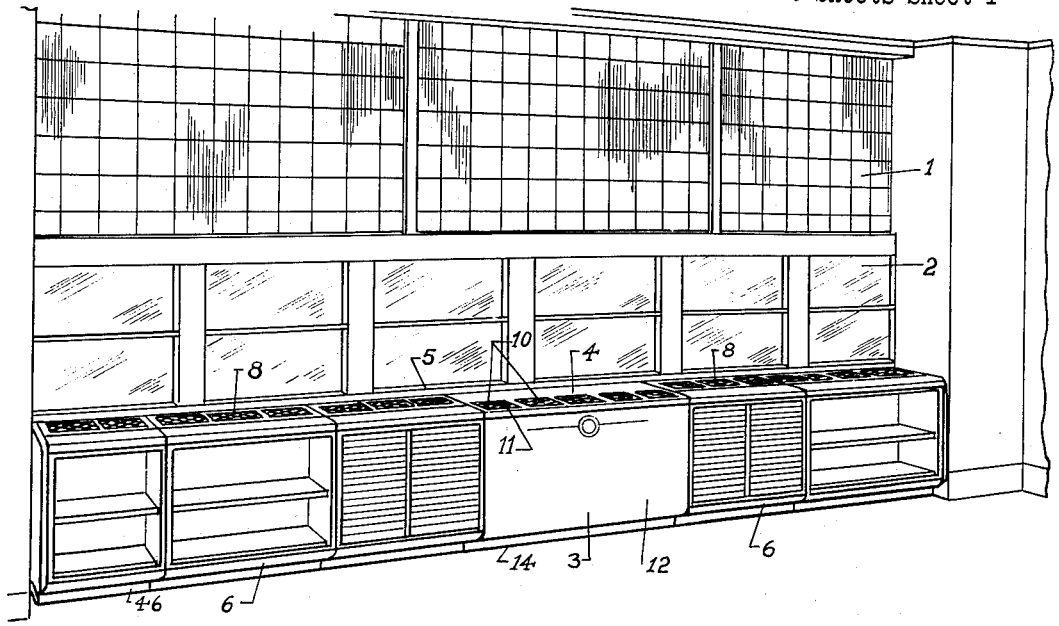
Figure 1 is a perspective view illustrating the invention installed in a schoolroom.
Figure 5:
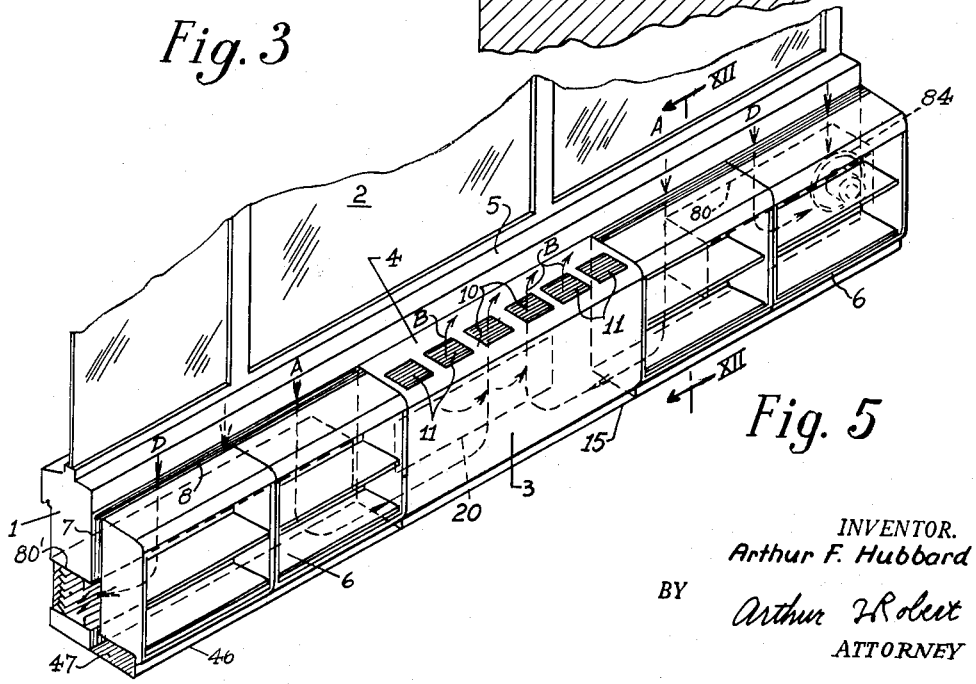
Figure 5 is a diagrammatic view illustrating the air flow in the arrangement shown in Figure 1.

Referring to Figures 1 and 5 of the drawing, the outside wall 1 of the room comprises an area of glass construction blocks surmounting the glazed windows 2, and a unit ventilator cabinet 3 is located near the middle of the wall, the top 4 of the unit ventilator cabinet reaching about to or just below the windowsill 5 or sun board level. The unit ventilator cabinet is flanked by utility cabinets 6 of any suitable type having their tops terminating substantially flush with the top of the unit ventilator cabinet. A space 7 covered by grilles 8 (Figures 5 and 12) is provided between the wall 1 and the backs of the cabinets 6. The effective opening to this space is controlled by dampers 9 (Fig. 12) extending across the back of each utility cabinet unit 6 and frictionally held in adjusted position. The space 7 is in communication with the recirculating air inlet of the unit ventilator cabinet 3, as will presently appear. The outlets 10 of the unit ventilator through which air is blown into the room are covered by grilles 11.

Figures 2, 12:
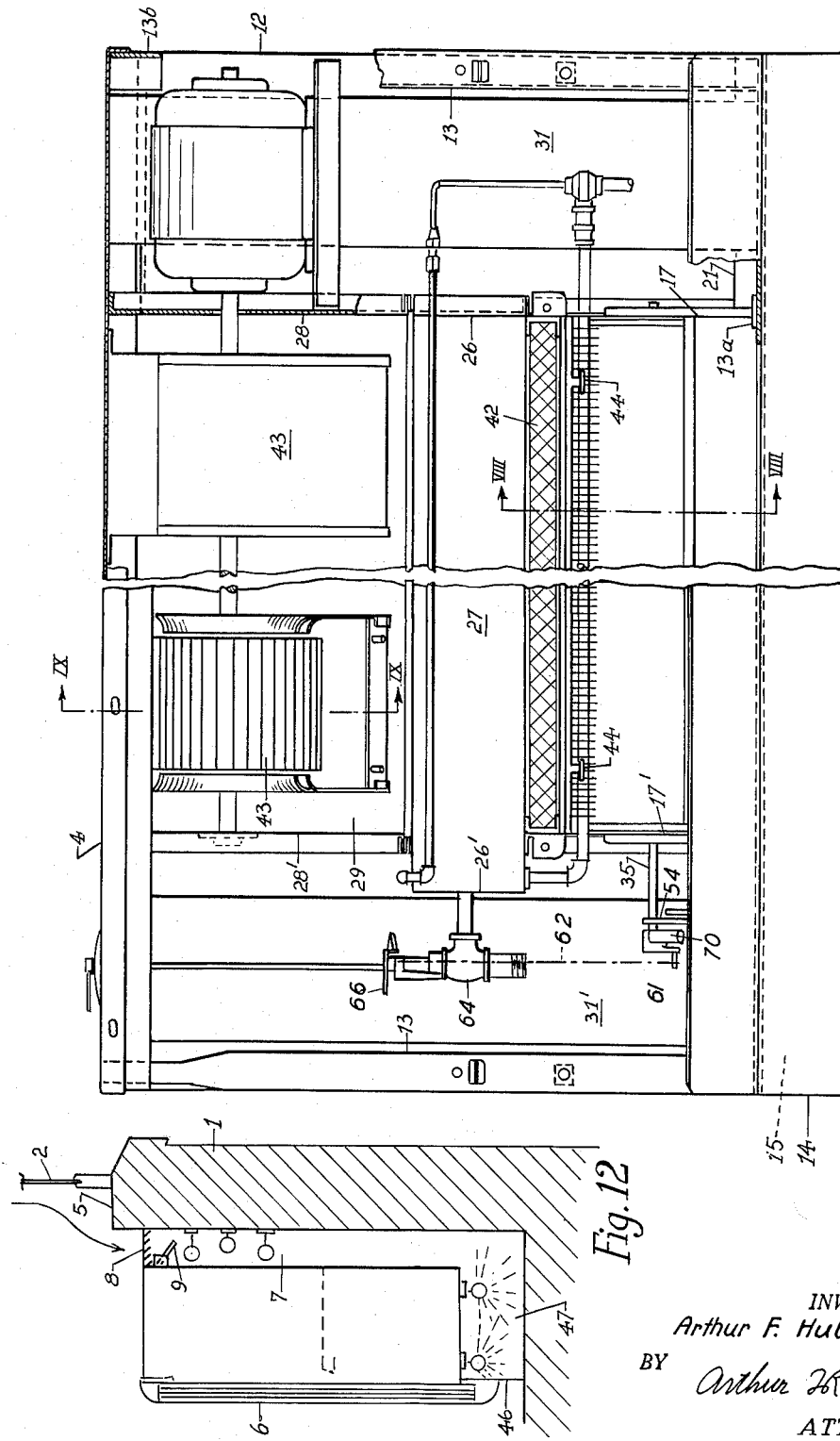
Figure 2 is a front view of a unit ventilator embodying the invention with the front cover removed and partly in section.
Figure 12 is a diagrammatic sectional view on line XII—XII of Figure 5.
Figure 3:
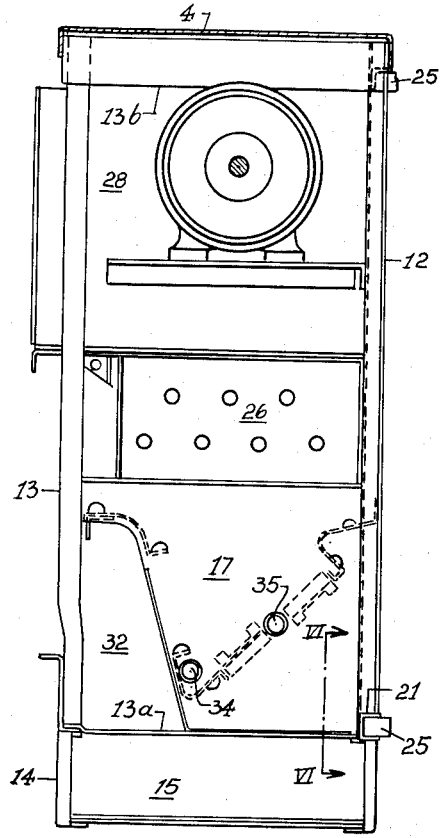
Figure 3 is an end view of the unit ventilator without pipe connections as seen from the right end of Figure 2.

Referring to Figures 2 and 3, the unit ventilator cabinet comprises a framework including a back 12 and front corner posts 13, fastened together by bottom brace bars 13a and end bars 13b welded thereto, or in any other suitable manner. The cabinet 3 stands upon a base 14 which provides a conduit 15 suitably connected with the recirculating air inlet, as will presently appear. The front cover of the unit ventilator is mounted in any suitable manner to be removable.

Figure 6:
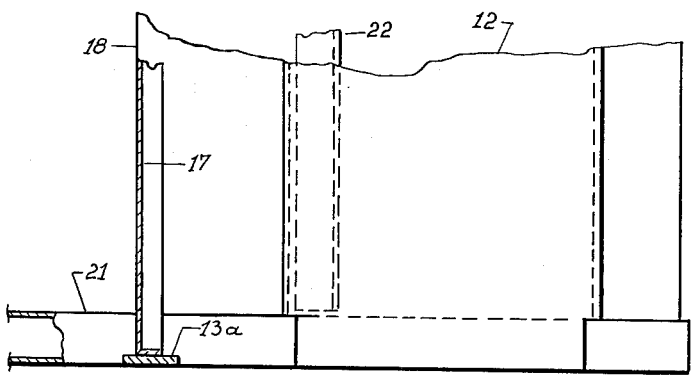
Figure 6 is a fragmentary view partly in section taken on line VI—VI of Figure 3.
Figure 7:
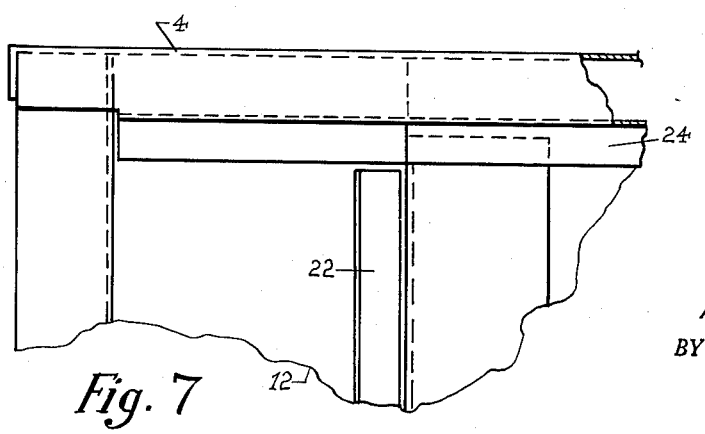
Figure 7 is a fragmentary elevation view as seen from the right of Figure 3.

Flanged partitions 17 and 17' are welded to the bottom brace bars 13a and to the back 12 at each end of the opening 18 (Figure 8) in the back, and a bottom plate 19 is fastened at its ends to the partitions and at its rear to a channel bar 21. Opening 18 registers with a fresh air inlet 20 in the wall 1. This channel bar extends along the bottom of opening 18, and together with a channel formed by angle bars 22 and back 12 (Figures 6, 7 and 9) and a channel 24 formed by the top cover 4 and back 12, receives a sealing strip 25 (Figures 3 and 9) of rubber or like material. This strip provides a seal between the back 12 and the wall 1 around opening 20 as diagrammatically shown in Figure 4, to prevent leakage of air from outdoor air inlet 20 directly into the room. Mounted above partitions 17, 17' (Figures 2 and 3) are partitions 26, 26' of a heating chamber 27, and partitions 28, 28' provide a fan or blower chamber 29. Any desired number of blowers or fans may be provided in chamber 29. The cabinet 3 thus provides end chambers 31, 31' communicating with the space 32, which in turn communicates at the bottom with conduit 15.

A pair of damper shafts 34, 35 (Figures 3, 4 and 8) are suitably journalled in the partitions 17, 17', and carry respectively a recirculating air damper 36 and an outdoor air damper 37, which cooperate with suitable sealing means around openings 38 and 39 to control or close these openings. Opening 39 connects the mixing chamber 40 with the opening 18 and passage 20 in the wall for outdoor air, and opening 38 connects the mixing chamber with space 32, which in turn communicates with the recirculating air ducts 15 and 7. The dampers 36 and 37 are interconnected, as will be later described in detail. Air from the mixing chamber is drawn upwardly through the replaceable filter 42 and through heating chamber 27, into fan chamber 29, enters the housings of the several fans 43 through the end openings, and is blown upwardly at an angle to the wall through the openings 10 as diagrammatically illustrated in Figure 4. A hinged door (not shown) at the front of the filter chamber mounted on brackets 44 (Figure 2) closes the filter chamber and may be opened to allow the filter to be replaced. Access to this door may be had by removing the front cover of the cabinet. The heater in chamber 27 operates as described in my Patent 2,532,550 issued December 5, 1950, and therefore need not be here described in detail.

Figure 4:
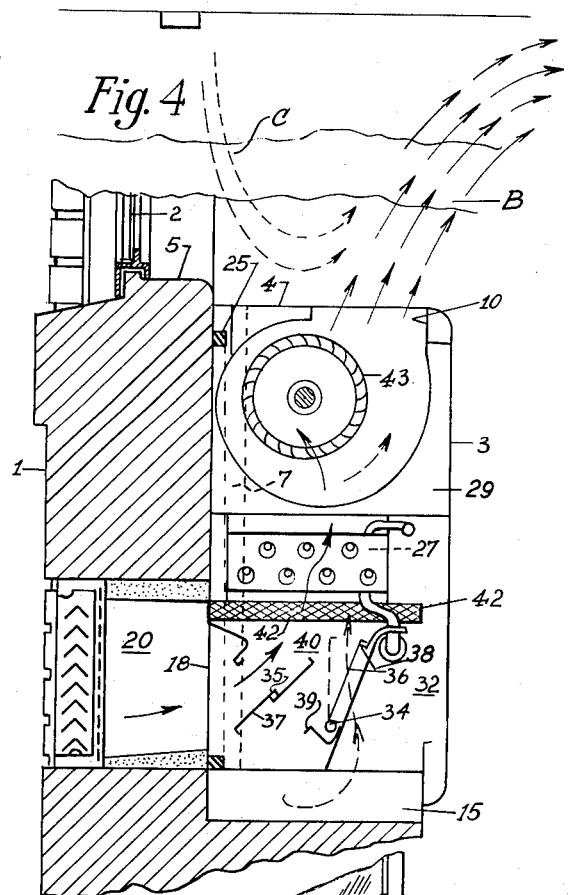
Figure 4 is a diagrammatic view illustrating the operation of the unit ventilator of Figure 2.

The operation of the invention so far described now will be explained. Referring to Figures 4 and 5, when recirculating damper 36 is open the suction of fans 43 causes the cold air adjacent the windows, as indicated by arrows A (Figure 5), to be drawn through the grilles 8 into the space 7 and to flow lengthwise into end chambers 31, 31' and through chamber 32 and opening 38 to the mixing chamber 40, and from there the air flows upward through filter 42, heater 27 to fan chamber 29 and is discharged by the fans through grilled openings 10 toward the ceiling as indicated by arrows B. The dampers 9 (Figure 12) are set so that all the recirculated air is not drawn from immediately adjacent the middle cabinet, but is drawn from along the entire window area. This prevents the cold air above the utility cabinets 6 from spilling over the cabinet tops into the room to cause the sensation of draft. The cold air adjacent the windows above the center cabinet 3 flows down as indicated by dotted arrows C (Figure 4) and being mixed with the upflowing current of air B, is tempered as it flows up toward the ceiling. At the ceiling the air spreads over the room and diffuses to comfort occupants of the room.

As shown in Figures 5 and 12, the base or foot portion 46 of the utility cabinets 6 may have a foot duct 47 running the length of the cabinets in communication with collecting chamber or passage 7 along its length and connected to end chambers 31, 31' of cabinet 3. This arrangement enlarges the collecting chamber or passage for recirculating air to flow to the mixing chamber to reduce flow resistance.

The damper operating mechanism now will be described. Recirculating air damper 36 carries two or more brackets 49 (Figure 8) with a counterweight bar 51 thereon. The damper shaft 34 exterior of plate 17' (Fig. 2) has an arcuate lever 52 (Figure 10) fastened thereon to turn with the shaft, this lever having a counterweight 53. Outside air damper shaft 35 carries an arm 54 with pins 55 and 56 therein, and a pair of crossed links 57, 58 swivelled to lever 52 at 57' and 58' have slots 59, 60 which receive pins 55 and 56 respectively. A second arm 61 on shaft 35 is connected to an operating rod 62 by a clevis or the like. In the position shown in Figure 10, arm 61 is in the position where both dampers 36 and 37 are partly open. Although the counterweight 51 tends to close damper 36, the fan suction or air pressure in the room acts on damper 36 to resist the counterweight and the opening of damper 36 under pressure of the air is limited by the pin 56 engaging the end of slot 60. When arm 61 is turned counterclockwise by movement of operating rod 62, the shaft 35 is rotated counterclockwise thereby to close outdoor air damper 37. The movement of pin 56 to the right allows arm 52 and shaft 34 to rotate and further open damper 36, until when damper 37 is fully closed damper 36 is fully open. When arm 61 is turned clockwise, outdoor air damper 37 is opened and the pin 56 engaging the left end of slot 60 causes recirculating air damper 36 to close. The link 58 thus reverses the motion between dampers 36, 37. In opening position of damper 36, should a gust of air enter from the outside air opening, the damper 36 is free to close because closing movement will slide link 58 along pin 56 and link 57 can slide along pin 55.

Valve 64 controls the flow of steam or other heating fluid to the radiator in chamber 27, and has an operating stem 65 with a sleeve thereon supporting a cam 66 rotatable with the valve stem. A collar 67 on the valve housing is fastened to a bracket 68 carried on the cabinet wall, and an arm 69 integral with the collar pivotally supports a follower arm 71 which engages cam 66 at one end by a suitable anti-friction tip. The opposite end of arm 71 is fastened to rod 62 by a clevis.

A counterweight 70 is suitably secured on shaft 35, as by a set screw. This counterweight maintains a constant pressure of follower 71 against the cam 66 so that damper 37 will be positioned by rod 62 as required by the cam.

It will be seen that when valve 64 is turned the cam 66 cooperates with follower 71 to operate the dampers through rod 62. An operating stem 73 for the valve is journalled in the top of the cabinet and is connected by a universal joint to square sleeve 74, which in turn is coupled by a rod and universal joint to the valve stem 65, so that turning the stem 74 operates the valve and the dampers.

The manual control 73 for the heater operates the dampers. When the valve 64 is nearly opened the outside air damper is in closed or throttled position, while the recirculating air damper is held open by the suction of the fans. When the heating valve is turned toward closed position the outside air damper moves further open and the shifting of pin 56 to the left moves link 56 toward the left and forces the recirculating air damper to move toward closed position. At night, when the fans are turned off and the outdoor damper is closed, pin 55 engages the right end of slot 59 in link 57 and holds the recirculating air damper open to allow heating by convection, the opening of damper 36 being permitted because pin 56 is at some midpoint of slot 60. It will be understood that the manual control mechanism of valve 64 and of the dampers may be replaced by an automatic temperature regulating mechanism or mechanisms, a number of such mechanisms being commercially available. Such automatic controls usually operate generally as follows: Initially the outdoor damper is closed when the room is cold, and as the room temperature rises to near the desired value the outdoor damper starts to open, and reaches a predetermined open setting, while at the same time the recirculating air damper commences to close. As the temperature increases the valve 64 supplying heat is throttled and may finally close. As the valve closes, the outdoor damper opens wider to provide cooling for the room. A low-limit thermostat prevents the air being supplied to the room from falling below the desired value.

Figure 16:
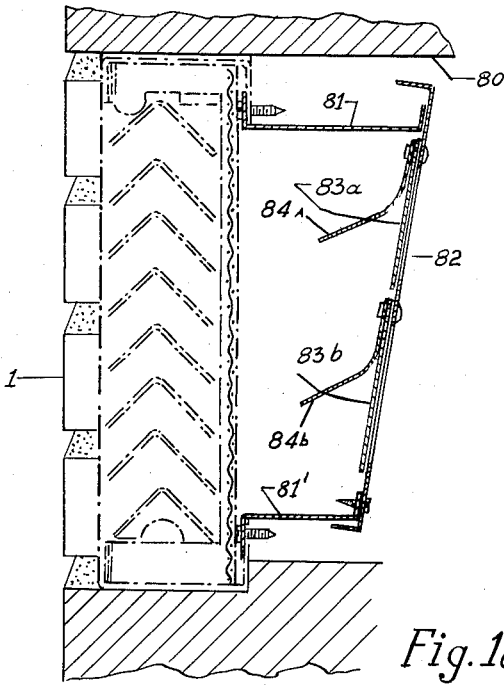
Figure 16 is a sectional view of a shuttered vent.
Figure 17:
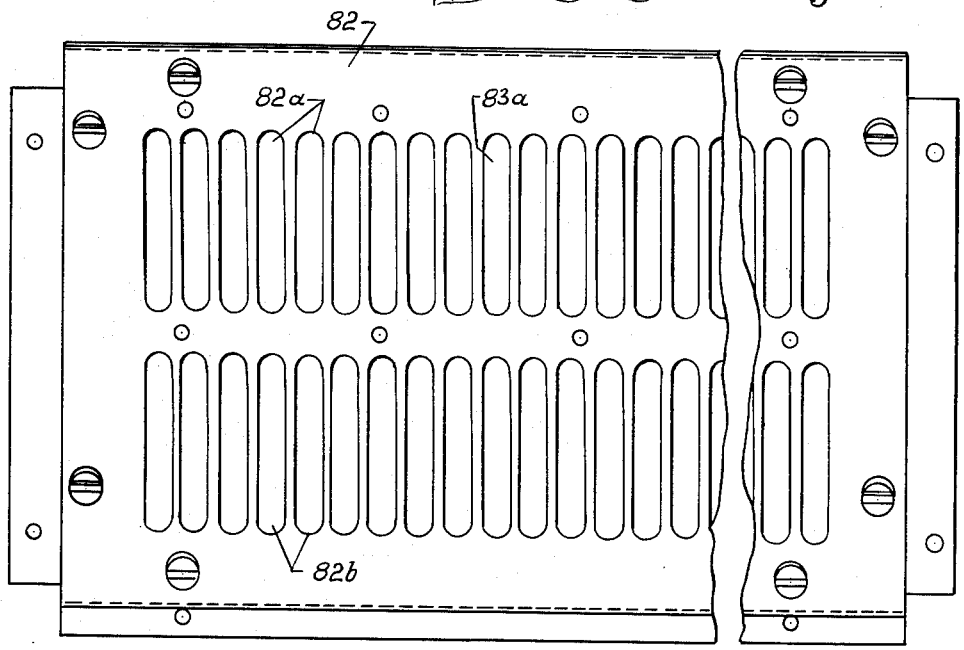
Figure 17 is an elevation view of Figure 16.

As previously explained, when outside air is being admitted to the room, an equal volume of air must escape from the room, and the invention further contemplates a novel arrangement for venting air from the room. Referring to Figure 5, vent openings 80, 80' are provided in wall 1, these openings being located preferably at the ends of the wall behind the utility cabinets 6. These vents are controlled automatically by a one-way shutter that allows venting of air only when a positive air pressure is applied in the room to the shutter. Referring to Figures 16 and 17, the shutter comprises top and bottom plates 81, 81' to which is secured a front plate 82 having two series of openings 82a and 82b. Behind the top openings a pliable flap 83a is attached along its upper edge, so that when the flap drops as shown, it covers the openings 82a to positively prevent air flow through the holes from left to right, but a slight pressure in the room will push away the flap from the holes to allow air to flow from right to left. The flap preferably is made of a glass fiber cloth coated with a silicone rubber, and preserves its pliability within the atmospheric temperature range. A similar flap 83b covers the row of openings 82b. Stop plates 84a and 84b behind the flaps limit their movement and prevent fluttering. This shutter is mounted in a compact frame with a demountable outdoor weather louver, and a coarse mesh wire screen. If desired, a fan 84 (Figure 5) may be positioned at each vent to assist in exhausting air.

The operation of the entire heating and ventilating system now will be described. Referring to Figures 4 and 5, the air adjacent the wall above the utility cabinets is drawn down into space 7, then along the wall and through the foot ducts to the unit ventilator as indicated by arrows A, where it is processed and discharged upwardly as indicated by arrows B. By reason of the arrangement of dampers 9 (Figure 12) in the space 7, the air for recirculation is drawn from substantially the full length of the wall, the location of the arrows A being merely illustrative.

Figure 13:
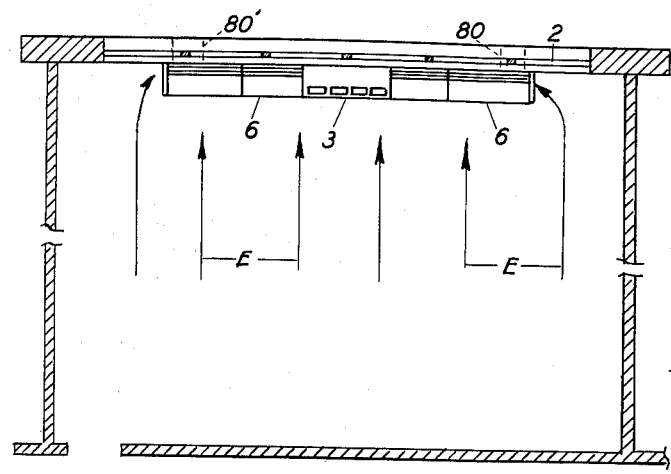
Figure 13 is a diagrammatic plan view showing air flow in the occupied space of a room equipped with the invention.

When outdoor air damper 37 is partially open and the recirculating air damper 36 also is partially open, the fans 43 draw air from outdoors through opening 39 into the mixing chamber 40 where the outdoor air is mixed with recirculating air and the mixed air is discharged upwardly as shown by arrows B. The introduction of outdoor air reduces the amount of air from along the windows drawn into the fans, but also creates a positive pressure in the room, so that some of the air along the windows flows as indicated by arrows D into space 7 and along the wall toward the vents 80, 80' and escapes through the vents. The amount of air that escapes in this way is substantially equal to the amount of outdoor air introduced through the air intake, assuming there is no other venting of air from the room. The air flow condition existing in the room in the occupied space is diagrammatically shown in Figure 13 where the arrows E show the drift of air throughout the entire room toward the cold outside wall in which the vents are located. There are no localized draft areas near the floor or at other parts of the room.

Figure 14:
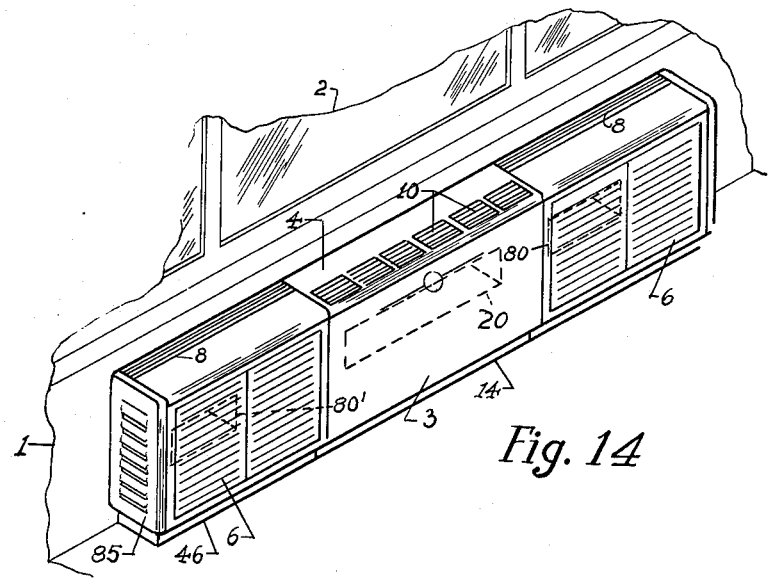
Figure 14 is a perspective view similar to Figure 5 of a modification.

In the modification shown in Figure 14 the utility cabinets 6 do not extend the full length of the window area and have grilled covers 85 which provide end chambers connecting with space 7 so that air is drawn through grilles 8 and end covers 85 to the recirculating air inlet of the unit ventilator 3. The exhaust vents 80, 80' are behind the utility cabinets and serve to remove air from the room without creating drafts, as above described.

Figure 15:
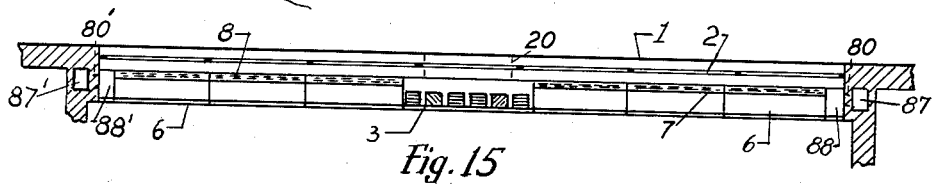
Figure 15 is a plan partly in section above windowsill level of a modification.

Figure 15 shows an embodiment where vent shafts 87, 87' are located in the wall of the building communicating with vents 80, 80' for removal of air from the room. End filler sections 88, 88' are provided at the ends of the utility cabinets to conceal the automatic air pressure operated shutters (in vents 80, 80' shown in Figures 16 and 17) these sections being in communication with the space 7 along the wall.

I claim as my invention:

1. A heating and air circulating apparatus for a room having a light-admitting area in the upper portion of an outside wall which comprises: a heating and air circulating cabinet adapted to be located along said wall below the light-admitting area having an air inlet, and having an air outlet adjacent the top, with air heating means and blower means between the inlet and outlet, the light admitting area extending beyond at least one end of said cabinet; and a passageway at an end of said cabinet adapted to extend adjacent and along said outside wall below the portion of the light-admitting area extending beyond the end of the cabinet, and substantially coextensive with said portion in length, said passageway communicating along its length with the room adjacent the light-admitting area and at an end of said passageway with the inlet of said cabinet for drawing air from the room adjacent the light admitting area into said passageway for recirculation through said cabinet.

2. An apparatus as specified in claim 1 wherein said cabinet has a second inlet communicating with the outside of said room for admission of outside air, and having damper means between said inlets to proportion outside air and recirculating air.

3. An apparatus as specified in claim 1 wherein an exhaust passageway extending to the exterior of the room is provided in communication with said first passageway, and a one way damper controlling said exhaust passageway allows flow of air from said first passageway through said exhaust passageway.

4. An apparatus as specified in claim 3 wherein said exhaust passageway is located adjacent an extremity of said first passageway remote from the heating and air circulating cabinet.

5. An apparatus as specified in claim 1 having individually adjustable dampers extending along said passageway to distribute the flow of air from the top along its length into said passageway.

6. A ventilating and heating apparatus as specified in claim 1 wherein one wall of said passageway comprises cabinets arranged along said wall in spaced relation thereto.

7. A heating and air circulating apparatus for a room having a light-admitting area in the upper portion of an outside wall which comprises: a heating and air circulating cabinet adapted to be located intermediate the ends of the wall below the light-admitting area; said cabinet including an air inlet and an air outlet with heating means and blower means between the inlet and outlet for forcibly directing air from the cabinet into the room; the light admitting area extending beyond both ends of said cabinet; passageways at the ends of said cabinet adapted to be located along the wall below the part of the light-admitting area extending beyond the ends of said cabinet and substantially coextensive with said area in length, communicating substantially at their tops along their length with the room adjacent the light admitting area and connected to said air inlet of said cabinet to supply air from along said light-admitting area to said cabinet for recirculation.

8. A room designed for draftless heating and ventilating having an outside wall with a light admitting area therein comprising: a heating and air circulating cabinet in the room below the light admitting area, having an air inlet, and having an air outlet, and including air heating means and blower means between the inlet and outlet for directing air through the outlet into the room, the light admitting area extending beyond at least one end of said cabinet; and a partition forming on one side a passageway extending from an end of said cabinet along said outside wall adjacent and below the portion of the light admitting area extending beyond the end of said cabinet, and substantially coextensive therewith in length, said partition providing communication along its length with the room adjacent the light admitting area, for admitting air from adjacent the light admitting area to said passageway; an exhaust passageway in communication with the first passageway and extending to the exterior of the room; and a one way damper in said exhaust passageway allowing air flow from said first passageway through said exhaust passageway to the exterior of the room.

9. A structure as specified in claim 8 wherein said first mentioned passageway connects to the air inlet of said cabinet for directing air in said passageway to said inlet for recirculation.

10. An apparatus as specified in claim 1 wherein an exhaust passageway extending to the exterior of the room is provided in communication with said first passageway for flow of air from said first passageway through said exhaust passageway.

11. An apparatus as specified in claim 10 having blower means adjacent said exhaust passageway to force air through said exhaust passageway.

12. A heating and air circulating apparatus as specified in claim 7 having exhaust passageways extending to the exterior of the room in communication respectively with said first passageways for flow of air from said first passageways through said exhaust passageways.

13. An apparatus as specified in claim 12 having a one way damper controlling each said exhaust passageway.

14. A heating and ventilating system comprising in combination: a room having an outside wall; a ventilating and heating cabinet in said room along a portion of said wall, said wall being extended laterally of said cabinet for a substantial distance beyond one end of said cabinet, so that when the wall becomes chilled by outdoor low temperatures, down drafts tend to develop along said extended portion of said wall; said cabinet having air inlet means, an air outlet, air heating means and blower means, the latter being interposed between the air inlet means and the air outlet with its suction and pressure sides connected, respectively, to said air inlet means and air outlet for directing a stream of air through said air outlet into said room; a passageway extending adjacent said wall along the lower portion thereof, from said one end of said cabinet toward the corresponding end of said room for a distance substantially coextensive with said extended portion of said wall, said passageway being connected with the suction side of said blower means and having inlet communication with said room along its length and adjacent said wall so that air is drawn by the blower from the room into said passageway and recirculated.

15. A heating and ventilating system as specified in claim 34 wherein: said air inlet means includes a fresh air inlet and a room air inlet for recirculating room air; a damper means movable from an extreme recirculating air position, in which it substantially cuts off said fresh air inlet from communication with the suction side of the blower, to an extreme fresh air position, in which it substantially cuts off said recirculating air inlet and said passageway from the suction side of the blower; and an exhaust duct, extending from the passageway to the exterior of said room, so that, when the blower means is introducing fresh air into the room with the damper means in its extreme fresh air position, air may be forced from said passageway into said exhaust duct.

16. The apparatus of claim 1 in combination with a room having an outside wall as mentioned in claim 1.

References Cited in the file of this patent

UNITED STATES PATENTS

| | | |
|---|---|---|
| 1,485,887 | Scanlan | Mar. 4, 1924 |
| 1,760,166 | Page | May 27, 1930 |
| 1,913,681 | Otis | June 13, 1933 |
| 1,919,625 | Ewald | July 25, 1933 |
| 1,977,248 | Space | Oct. 16, 1934 |
| 1,988,745 | Nelson | Jan. 22, 1935 |
| 2,018,236 | Space | Oct. 22, 1935 |
| 2,023,447 | Shurtleff | Dec. 10, 1935 |
| 2,029,368 | Goldthwaite | Feb. 4, 1936 |
| 2,112,601 | Kalischer | Mar. 29, 1938 |
| 2,176,319 | Anderson | Oct. 17, 1939 |
| 2,180,459 | Earle | Nov. 21, 1939 |
| 2,224,407 | Passur | Dec. 10, 1940 |
| 2,235,500 | Kitchen | Mar. 18, 1941 |
| 2,240,354 | Smith | Apr. 29, 1941 |
| 2,275,772 | Koch | Mar. 10, 1942 |
| 2,276,850 | Lemmers | Mar. 17, 1942 |
| 2,327,664 | Otis | Aug. 24, 1943 |
| 2,349,541 | Earle | May 23, 1944 |
| 2,359,057 | Skinner | Sept. 26, 1944 |
| 2,532,550 | Hubbard | Dec. 5, 1950 |